United States Patent
Sjöberg et al.

(10) Patent No.: US 11,070,818 B2
(45) Date of Patent: Jul. 20, 2021

(54) DECODING A BLOCK OF VIDEO SAMPLES

(71) Applicant: Telefonaktiebolaget LM Ericsson (publ), Stockholm (SE)

(72) Inventors: Rickard Sjöberg, Stockholm (SE); Kenneth Andersson, Gävle (SE); Jacob Ström, Stockholm (SE); Per Wennersten, Årsta (SE); Zhi Zhang, Solna (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 500 days.

(21) Appl. No.: 16/080,087

(22) PCT Filed: Jun. 4, 2018

(86) PCT No.: PCT/SE2018/050575
§ 371 (c)(1),
(2) Date: Aug. 27, 2018

(87) PCT Pub. No.: WO2019/009776
PCT Pub. Date: Jan. 10, 2019

(65) Prior Publication Data
US 2021/0195215 A1    Jun. 24, 2021

Related U.S. Application Data

(60) Provisional application No. 62/528,655, filed on Jul. 5, 2017.

(51) Int. Cl.
*H04N 19/176*    (2014.01)
*H04N 19/122*    (2014.01)
(Continued)

(52) U.S. Cl.
CPC ......... *H04N 19/176* (2014.11); *H04N 19/122* (2014.11); *H04N 19/124* (2014.11); *H04N 19/159* (2014.11)

(58) Field of Classification Search
CPC .. H04N 19/176; H04N 19/122; H04N 19/124; H04N 19/159
See application file for complete search history.

(56) References Cited

U.S. PATENT DOCUMENTS 9,161,046 B2 * 10/2015 Van der Auwera ......................... H04N 19/176
9,451,259 B2 * 9/2016 Chono .................. H04N 19/91
(Continued)

FOREIGN PATENT DOCUMENTS

CN    106878713 A  *  6/2017  .......... H04N 19/126
EP    2713612 A2      4/2014
(Continued)

OTHER PUBLICATIONS

Supplementary European Search Report dated Feb. 23, 2021 for International Application No. EP18828078, consisting of 9-pages.
(Continued)

*Primary Examiner* — Reza Aghevli
(74) *Attorney, Agent, or Firm* — Christopher & Weisberg, P.A.

(57) ABSTRACT

A method of decoding a block of video samples from a video bitstream is provided in which the method includes decoding a DQPRP value, deriving a PQP value for a block having a non-zero residual, decoding a DDQP value for the block, deriving a SDQP value for the block from the DDQP value and the DQPRP value, deriving a block QP value for the block from the SDQP value and the PQP value, decoding at least one non-zero coefficient of the block, deriving values of a residual block for the block by first scaling the at least one non-zero coefficient using the QP value and thereafter applying an inverse transform, deriving values of a prediction block spatial or temporal prediction, and deriving
(Continued)

decoded sample values for the block by adding the values of the residual block and the values of the prediction block.

20 Claims, 4 Drawing Sheets

(51) Int. Cl.
*H04N 19/159* (2014.01)
*H04N 19/124* (2014.01)

(56) References Cited

U.S. PATENT DOCUMENTS

| | | | | |
|---|---|---|---|---|
| 9,819,952 | B2* | 11/2017 | Lu | H04N 19/119 |
| 2005/0053150 | A1* | 3/2005 | Hsu | H04N 19/186 |
| | | | | 375/240.18 |
| 2005/0053302 | A1* | 3/2005 | Srinivasan | H04N 19/184 |
| | | | | 382/248 |
| 2009/0296808 | A1* | 12/2009 | Regunathan | H04N 19/124 |
| | | | | 375/240.03 |
| 2012/0189052 | A1* | 7/2012 | Karczewicz | H04N 19/124 |
| | | | | 375/240.12 |
| 2013/0287103 | A1* | 10/2013 | Seregin | H04N 19/124 |
| | | | | 375/240.12 |
| 2014/0003498 | A1* | 1/2014 | Sullivan | H04N 19/117 |
| | | | | 375/240.03 |
| 2014/0119432 | A1* | 5/2014 | Wang | H04N 19/176 |
| | | | | 375/240.2 |
| 2014/0286398 | A1* | 9/2014 | Chono | H04N 19/1887 |
| | | | | 375/240.03 |
| 2015/0049805 | A1* | 2/2015 | Zhou | H04N 19/61 |
| | | | | 375/240.03 |
| 2015/0071343 | A1* | 3/2015 | Novotny | H04N 19/137 |
| | | | | 375/240.03 |
| 2015/0326859 | A1* | 11/2015 | Chono | H04N 19/126 |
| | | | | 375/240.03 |
| 2015/0365671 | A1* | 12/2015 | Pu | H04N 19/117 |
| | | | | 375/240.03 |
| 2015/0365695 | A1* | 12/2015 | Pu | H04N 19/186 |
| | | | | 375/240.16 |
| 2016/0014421 | A1* | 1/2016 | Cote | H04N 19/196 |
| | | | | 382/170 |
| 2016/0316206 | A1* | 10/2016 | Sullivan | H04N 19/174 |
| 2018/0048907 | A1 | 2/2018 | Rusanovskyy et al. | |
| 2018/0167615 | A1* | 6/2018 | Kim | H04N 19/98 |

FOREIGN PATENT DOCUMENTS

| | | | | |
|---|---|---|---|---|
| EP | 2728864 | A1 * | 5/2014 | H04N 19/463 |
| EP | 2728864 | A1 | 5/2014 | |
| EP | 2908526 | A1 * | 8/2015 | H04N 19/33 |
| EP | 2908526 | A1 | 8/2015 | |
| EP | 3101896 | A1 * | 12/2016 | H04N 19/152 |
| EP | 3101896 | A1 | 12/2016 | |
| KR | 20130135357 | A * | 12/2013 | H04N 19/91 |
| WO | 2013003284 | A1 | 1/2013 | |
| WO | WO-2013003284 | A1 * | 1/2013 | H04N 19/61 |
| WO | WO-2014002399 | A1 * | 1/2014 | H04N 19/13 |

OTHER PUBLICATIONS

Jianle Chen et al.; Higher granularity of quantization parameter scaling and adaptive delta QP signaling; Joint Collaborative Team on Video Coding (JCT-VC) of ITU-T SG16 WP3 and ISO/IEC JTC1/SC29/WG11; Source: Samsung Electronics Co., Ltd.; Purpose: Proposal; Status: Input Document; Document: JCTVC-F495, 6th meeting; Date and Location: Jul. 14-22, 2011, Torino, IT, consisting of 6-pages.

Dzung Hoang.; Finer scaling of quantization parameter; Joint Collaborative Team on Video Coding (JCT-VC) of TU-T SG16 WP3 and ISO/IEC JTC1/SC29/WG11; Source: Zenverge, Inc.; Purpose: Proposal; Status: Input Document to JCT-VC; Document: JCTVC-D041, 4th Meeting; Date and Location: Jan. 20-28, 2011, Daegu, Korea, consisting of 5-pages.

Jill Boyce et al.; Draft high efficiency video coding (HEVC) version 2, combined format range extensions (RExt), scalability (SHVC) and multi-view (MV-HEVC) extensions; Joint Collaborative Team on Video Coding (JCT-VC) of ITU-T SG16 WP3 and ISO/IEC JTC1/SC29/WG11; Source: Editors; Status: Output Document of JCT-VC; Document: JCTVC-R1013_v6,18th Meeting; Date and Location: Jun. 30-Jul. 9, 2014, Sapporo, JP, consisting of 535-pages.

International Search Report and Written Opinion dated Sep. 13, 2018 for International Application No. PCT/SE2018/050575 filed on Jun. 4, 2018, consisting of 14-pages.

Veludandi et al., "Linear Prediction based Data Detection of Convolutional Coded DQPSK in SIMO-OFDM" arXiv.org > cs > arXiv:1710.02977; Oct. 9, 2017, consisting of 7-pages.

International Telecommunication Union; ITU-T H.265; Telecommunication Standardization Sector of ITU; "Series H: Audiovisual and Multimedia Systems Infrastructure of audiovisual services—Coding of moving video"; High efficiency video coding; Dec. 2016, consisting of 664-pages.

* cited by examiner

Table 1

| Resolution parameter value | Delta QP factor | Quantization step effect | Example output QP given a current QP value equal to 25 and a delta QP equal to 1 | Valid delta QP values given a valid range of -10 to 10 inclusive |
|---|---|---|---|---|
| 0 | 1 | $X\frac{1}{6}$ | 26 | -10, -9, ..., 9, 10 |
| 1 | 2 | $X\frac{2}{6}$ | 27 | -5, -4, ..., 4, 5 |
| 2 | 3 | $X\frac{3}{6}$ | 28 | -3, -2, -1, 0, 1, 2, 3 |
| 3 | 4 | $X\frac{4}{6}$ | 29 | -2, -1, 0, 1, 2 |
| 4 | 5 | $X\frac{5}{6}$ | 30 | -2, -1, 0, 1, 2 |
| ... | ... | | ... | |

Table 2

| | Y | U | V |
|---|---|---|---|
| Class A1 | -1.12% | -0.49% | -0.28% |
| Class A2 | -1.25% | -1.18% | -1.29% |
| Class B | -0.84% | -0.85% | -1.03% |
| Class C | -0.94% | -0.30% | -0.14% |
| Class D | -0.29% | -0.88% | -1.03% |
| Class E | | | |
| Overall (Ref) | -0.88% | -0.74% | -0.77% |
| Class F (optional) | -0.79% | -0.79% | -0.63% |

Fig. 5 (Cont.)

Table 3

| Denominator parameter code word/value | Quantization step effect | Proposed n first quantization step sizes ΔQ (for 8 bit) | Proposed scaled and rounded integer array QI using 64 scaling | Proposed max/min QP | Max/min effect |
|---|---|---|---|---|---|
| 0 / 6 | $x^{\frac{1}{6}}$ | $[2^{-4/6}, 2^{-3/6}, 2^{-2/6}, 2^{-1/6}, 1, 2^{1/6}]$ | [40, 45, 51, 57, 64, 72] | 0, 51 | 0.63 to 228 |
| 1 / 5 | $x^{\frac{1}{5}}$ | $[2^{-3/5}, 2^{-2/5}, 2^{-1/5}, 1, 2^{1/5}]$ | [42, 49, 56, 64, 75] | 0, 42 | 0.66 to 223 |
| 2 / 4 | $x^{\frac{1}{4}}$ | $[2^{-3/4}, 2^{-2/4}, 2^{-1/4}, 1]$ | [38, 45, 53, 64] | 0, 35 | 0.59 to 256 |
| 3 / 3 | $x^{\frac{1}{3}}$ | $[2^{-2/3}, 2^{-1/3}, 1]$ | [40, 51, 64] | 0, 26 | 0.63 to 256 |
| 4 / 2 | $x^{\frac{1}{2}}$ | $[2^{-1/2}, 1]$ | [45 64] | 0, 17 | 0.71 to 256 |
| 5 / 1 | $x^{\frac{1}{1}}$ | $[2^{-1/1}]$ | [32] | 0, 9 | 0.5 to 256 |

Table 4

| Quantization step effect | Scaling (s) | Proposed n first quantization step sizes ΔQ (for 8 bit) | Proposed scaled and rounded integer array QI using 64 scaling | Proposed max/min QP | Max/min effect |
|---|---|---|---|---|---|
| $x^{\frac{1}{6}}$ | 1 | $s*[2^{-4/6}, 2^{-3/6}, 2^{-2/6}, 2^{-1/6}, 1, 2^{1/6}]$ | [40, 45, 51, 57, 64, 72] | 0, 51 | 0.63 to 228 |
| $x^{\frac{1}{5}}$ | 0.954842 | $s*[2^{-3/5}, 2^{-2/5}, 2^{-1/5}, 1, 2^{1/5}]$ | [40, 46, 53, 61, 70] | 0, 42 | 0.63 to 244 |
| $x^{\frac{1}{4}}$ | 1.059463 | $s*[2^{-3/4}, 2^{-2/4}, 2^{-1/4}, 1]$ | [40, 48, 57, 68] | 0, 35 | 0.63 to 271 |
| $x^{\frac{1}{3}}$ | 1 | $s*[2^{-2/3}, 2^{-1/3}, 1]$ | [40, 51, 64] | 0, 26 | 0.63 to 256 |
| $x^{\frac{1}{2}}$ | 0.890899 | $s*[2^{-1/2}, 1]$ | [40 57] | 0, 17 | 0.63 to 228 |
| $x^{\frac{1}{1}}$ | 1.259921 | $s*[2^{-1/1}]$ | [40] | 0, 9 | 0.63 to 23 |

DECODING A BLOCK OF VIDEO SAMPLES

CROSS-REFERENCE TO RELATED APPLICATIONS

This application is a Submission Under 35 U.S.C. § 371 for U.S. National Stage Patent Application of International Application Number: PCT/SE2018/050575, filed Jun. 4, 2018 entitled "DECODING A BLOCK OF VIDEO SAMPLES," which claims priority to U.S. Provisional Application No. 62/528,655, filed Jul. 5, 2017, the entireties of both of which are incorporated herein by reference.

TECHNICAL FIELD

The invention relates to a method of decoding a block of video samples from a video bitstream, a video decoder for decoding a block of video samples from a video bitstream, a corresponding computer program, and a corresponding computer program product.

BACKGROUND

High Efficiency Video Coding (HEVC) is a block-based video codec standardized by the Telecommunication Standardization Sector of the International Telecommunications Union (ITU-T) and the Moving Picture Experts Group (MPEG) that utilizes both temporal and spatial prediction. Spatial prediction is achieved using intra-prediction (I) within the current frame. Temporal prediction is achieved using inter-prediction (P) or bi-directional (B) inter-prediction on block level from previously decoded reference pictures.

On the encoder side, the difference between the original pixel data and the predicted pixel data, referred to as a residual, is transformed into the frequency domain and quantized before being entropy coded and transmitted, together with necessary prediction parameters such as mode selections and motion vectors. By quantizing the transformed residuals, the tradeoff between bitrate and quality of the video may be controlled. On the decoder side, the quantized frequency-coefficients and the prediction parameters are decoded from the bitstream, and the residual is formed by inverse quantization and transformation of those coefficients. A spatial or temporal prediction is derived based on the prediction parameters, and the residual is added to it.

In HEVC, each picture is partitioned into Coding Tree Units (CTU). A CTU consist of an N×N-block of luma samples and two corresponding M×M-blocks of chroma samples. A CTU in HEVC is similar to a macroblock in H.264 and earlier standards, but in contrast to macroblocks the CTU size is configurable. Most often, the CTU size in HEVC is set to 64×64 luma samples.

Each CTU can be recursively split using a quadtree structure, where the root of the quadtree is associated with the CTU. The quadtree is split until a leaf is reached, which is referred to as a Coding Unit (CU). How each CTU is split is conveyed in the bitstream. The CU is the root of two other trees, the prediction tree, that has Prediction Units (PUs) as leaves, and the transform tree, that has Transform Units (TUs) as leaves. In HEVC, some decoding processes are done on CU level, some are done on PU level, and some are done on TU level.

The level of quantization is determined by the Quantization Parameter (QP). The QP is a key technique to control the quality and bitrate of the residual in video coding. It is applied such that it controls the fidelity of the residual (typically the transform coefficients) and thus also the amount of coding artifacts. The value of the QP is often referred to as the QP. For a high QP, the transform coefficients are quantized coarsely, resulting in fewer bits, but also possibly more coding artifacts, as compared to a small QP, for which the transform coefficients are quantized finely. A low QP thus generally results in high-quality video and a high QP results in low-quality video.

In HEVC v1 (ITU-T Recommendation H.265, SERIES H: AUDIOVISUAL AND MULTIMEDIA SYSTEMS, "High efficiency video coding", April 2013), and similarly in H.264/AVC, the quantization parameter can be controlled on slice level and block level. On slice level, it can be controlled individually for each color component. In HEVC v2 (ITU-T Recommendation H.265, SERIES H: AUDIOVISUAL AND MULTIMEDIA SYSTEMS, "High efficiency video coding", October 2014), the quantization parameter for chroma can be individually controlled for the chroma components on block level.

In both H.264 and HEVC, the quantizer step-size is defined such that the quantization and dequantization step-size is doubled every six QP values. This means that, if a quantized coefficient $Q_c$ is reconstructed to a coefficient value $R_c$ at QP equal to Q, then at QP equal to Q+6, $Q_c$ would be reconstructed to approximately $R_c/2$, and at QP equal to Q−6, $Q_c$ would be reconstructed to approximately $2 \cdot R_c$.

For HEVC, the QP value for 8-bit video ranges from 0 to 51, inclusive. Defining $\Delta q=1$ for QP=4, the quantization step size is $2^{(QP-4)/6}$. This means that the quantization effect doubles by every six-step increase of QP. The first six quantization step-sizes (for QP values 0 to 5) are, in array notation, $\Delta Q=[2^{-4/6}, 2^{-3/6}, 2^{-2/6}, 2^{1/6}, 1, 2^{1/6}]$. Using this array, the quantization step-size can be derived through table look-up, where the quantizer step-size for a QP value is $\Delta Q[QP \bmod 6] \cdot 2^{QP \text{ div } 6}$. For QP=51, e.g., $\Delta Q[51 \bmod 6] \cdot 2^{51 \text{ div } 6} = \Delta Q[3] \cdot 2^{51 \text{ div } 6} = 2^{-1/6} \cdot 2^8 = 2^{47/6}$. This is equivalent to using the $2^{(QP-4)/6}$ formula known from HEVC. Quantization and inverse quantization can for HEVC be performed through multiplications and bit-shift operations.

The dequantization process in HEVC is based on a table look-up design with six entries together with the corresponding shift values. In this way, the entire dequantization process for all QP values can compactly be defined using low-complex integer arithmetic. In HEVC, the array $\Delta Q$ is scaled by 64 and rounded such that the integer array of step sizes becomes QI=64·$\Delta Q$=[40, 45, 51, 57, 64, 72]. On the decoder side, a quantized input coefficient c from the bit stream is reconstructed as $$r = \text{round}\{c \cdot QI[QP \bmod 6] \cdot 2^{QP \text{ div } 6}\} \cdot 2^{-iq},$$

where QP is the quantizer value, QI is the integer array, and iq is the bit shift. The bit shift iq depends on the transform that is used. In HEVC, the transform design results in iq having the value of B+M−9, where B is the sample bit depth (e.g., 8 bits), and M is the size of the HEVC transform (e.g., M=8 for 8×8 transforms).

In HEVC v1, the quantization parameter can be controlled on block level by deltaQP (cu_qp_delta_abs and cu_qp_delta_sign_flag, which are signaled in the transform unit), which adjusts the quantization parameter both for luma and chroma. A deltaQP is only signaled if a block has a residual (i.e., non-zero coefficients). To be coded efficiently, deltaQP is defined as the difference between the actual QP for the block and a prediction of the QP for the block. In HEVC, the prediction of the QP is the average of the QP of the left block and the QP of the above block. A parameter in the Picture Parameter Set (PPS) is used to specify the minimum block-size for which the QP can be signaled. This is done by specifying a maximum block-split-depth relative to the CTU block-size. If the depth is 0, deltaQP is signaled once per CTU, if the depth is 1, deltaQP can be signaled up to four times per CTU, etc.

An adjustment of the chroma quantization parameter can, in HEVC v1, be signaled in the PPS (pps_cb_qp_offset and pps_cr_qp_offset) or in the slice header (slice_cb_qp_offset and slice_cr_qp_offset). In HEVC v2, an adjusted chroma quantization parameter can be signaled on block-level by deltaQP (cu_chroma_qp_offset_flag and cu_chroma_qp_offset_idx). deltaQP is only signaled if a block has a residual (i.e., non-zero coefficients). Similar to the deltaQP-signaling in HEVC v1, a PPS parameter is used to define the maximum depth relative to the CTU block size that in turn specifies the minimum block size for chroma deltaQP signaling. If the depth is 0, deltaQP is signaled once per CTU, if the depth is 1, deltaQP can be signaled up to four times per CTU, etc.

In HEVC, luma and chroma share the same transform quadtree, which in HEVC starts from the CU and ends at a leaf which is a TU.

An experimental codec called JEM (JVET Exploratory Model) is being developed jointly by the MPEG and the Video Coding Experts Group (VCEG) standardization groups. The JEM codec is an extension to the HEVC video coding standard and provides improved compression efficiency. JEM is not intended to be standardized, its purpose is to be a codec platform for finding evidence of compression improvements over HEVC.

Figure 1:
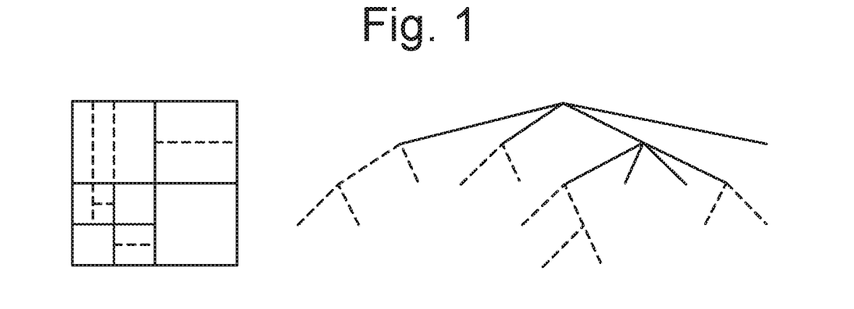
FIG. 1 illustrates an example of partitioning a CTU into CUs using QTBT.

In JEM v6.0, the concept of a Quadtree Binary Tree (QTBT) is used. In the QTBT block structure, a CU can have either a square or rectangular shape. As shown in FIG. 1, a CTU is first partitioned into a quadtree structure shown by solid lines. The quadtree leaf-nodes are further partitioned by a binary tree structure. There are two splitting types, symmetric horizontal splitting and symmetric vertical splitting, in the binary-tree splitting. The binary tree leaf-nodes are CUs which are used for prediction and transform without any further partitioning. In JEM, a CU sometimes consists of Coding Blocks (CBs) of different colour components, e.g., one CU contains one luma CB and two chroma CBs in the case of P- and B-slices of the 4:2:0 chroma format, and sometimes of a CB of a single component, e.g., one CU contains only one luma CB or just two chroma CBs in the case of I-slices. This is because for P- and B-slices, luma and chroma planes share the same coding unit since they share the same QTBT. For I-slices, there are separate QTBT structures for luma and chroma.

In JEM, each coding unit can have separate deltaQP values for luma and chroma for intra pictures. For inter pictures, however, the same deltaQP is used for luma and chroma, similar to what is done in HEVC v1.

The deltaQP in HEVC and JEM can be changed in units of 1, i.e., with a step size of 1, resulting in a quantization effect between two values which are one step size apart of $\sqrt[6]{2}=2^{1/6}$. Accordingly, a step change of six units corresponds to a doubling or a halving of the quantization effect. Hence, deltaQP coding can be costly if the QP values between blocks vary a lot, especially when small blocks are used, and the bit stream contains many deltaQP symbols.

SUMMARY

It is an object of the invention to provide an improved alternative to the above techniques and prior art.

More specifically, it is an object of the invention to provide a more efficient solution for coding quantization parameter values in video coding.

These and other objects of the invention are achieved by means of different aspects of the invention, as defined by the independent claims. Embodiments of the invention are characterized by the dependent claims.

According to a first aspect of the invention, a method of decoding a block of video samples from a video bitstream is provided. The block has non-zero coefficients. The method is performed by a video decoder and comprises decoding a Delta Quantization Parameter Resolution Parameter (DQPRP) value from the video bitstream, deriving a Predicted Quantization Parameter (PQP) value for a block having a non-zero residual, decoding a Decoded Block Delta Quantization Parameter (DDQP) value for the block, deriving a Scaled Block Delta Quantization Parameter (SDQP) value for the block from the DDQP value and the DQPRP value, deriving a block Quantization Parameter (QP) value for the block from the SDQP value and the PQP value, decoding at least one non-zero coefficient of the block from the video bitstream, deriving values of a residual block by first scaling the at least one non-zero coefficient using said QP value and thereafter applying an inverse transform, deriving values of a prediction block by spatial or temporal prediction, and deriving decoded sample values for the block by adding the values of said residual block and the values of said prediction block.

According to a second aspect of the invention, a video decoder for decoding a block of video samples from a video bitstream is provided. The video samples have non-zero coefficients. The video decoder comprises processing means and a memory comprising instructions which, when executed by the processing means, cause the video decoder to decode a Delta Quantization Parameter Resolution Parameter (DQPRP) value from the video bitstream, derive a Predicted Quantization Parameter (PQP) value for a block having a non-zero residual, decode a Decoded Block Delta Quantization Parameter (DDQP) value for the block, derive a Scaled Block Delta Quantization Parameter (SDQP) value for the block from the DDQP value and the DQPRP value, derive a block Quantization Parameter (QP) value for the block from the SDQP value and the PQP value, decode at least one non-zero coefficient of the block from the video bitstream, derive values of a residual block by first scaling the at least one non-zero coefficient using said QP value and thereafter applying an inverse transform, derive values of a prediction block by spatial or temporal prediction, and derive decoded sample values for the block by adding the values of said residual block and the values of said prediction block.

According to a third aspect of the invention, a computer program is provided. The computer program comprises computer-executable instructions for causing a video decoder to perform the method according to an embodiment of the first aspect of the invention, when the computer-executable instructions are executed on a processing unit comprised in the video decoder.

According to a fourth aspect of the invention, a computer program product is provided. The computer program product comprises a computer-readable storage medium which has the computer program according to the third aspect of the invention embodied therein.

The invention makes use of an understanding that a more efficient coding of quantization parameters, also known as QP or QP values, can be achieved by utilizing an adjustable resolution of the signaled deltaQP. Thereby, the quantization effect between step sizes may be increased, so that encoding larger quantization deltas, i.e., larger changes in quantization effect, becomes more efficient. For example, if the encoder doubles the quantization effect, the signaling of that change can be done with fewer bits the smaller the deltaQP to convey that change is. Advantageously, embodiments of the invention provide a reduced overhead for coding large deltaQP values for small blocks. In addition, it also becomes possible to decrease the step size. Quantization-step resolution-parameter values are provided in the bitstream to provide flexibility and to offer a trade-off between granularity and bit cost.

Even though advantages of the invention have in some cases been described with reference to embodiments of the first aspect of the invention, corresponding reasoning applies to embodiments of other aspects of the invention.

Further objectives of, features of, and advantages with, the invention will become apparent when studying the following detailed disclosure, the drawings, and the appended claims. Those skilled in the art realize that different features of the invention can be combined to create embodiments other than those described in the following.

BRIEF DESCRIPTION OF THE DRAWINGS

The above, as well as additional objects, features and advantages of the invention, will be better understood through the following illustrative and non-limiting detailed description of embodiments of the invention, with reference to the appended drawings, in which.

All the figures are schematic, not necessarily to scale, and generally only show parts which are necessary in order to elucidate the invention, wherein other parts may be omitted or merely suggested.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein. Rather, these embodiments are provided by way of example so that this disclosure will be thorough and complete, and will fully convey the scope of the invention to those skilled in the art.

The solutions described herein can be used on both the encoder side and the decoder side.

Embodiment 1

A resolution parameter for deltaQP encoding/decoding of a block of non-zero transform coefficients is derived. The resolution parameter controls the coarseness of the deltaQP change and is used to encode/decode deltaQP with different resolution. Preferably, to increase compression efficiency, the resolution is reduced compared to known solutions.

As an example, a deltaQP in the range of −6 to 6 can with half-resolution deltaQP-coding be limited to [−6, −4, −2, 0, 2, 4, 6] and be encoded as deltaQP divided by 2, i.e., [−3, −2, −1, 0, 1, 2, 3]. On the decoder side, deltaQP is derived by multiplication of the decoded deltaQP values by 2, resulting in [−6, −4, −2, 0, 2, 4, 6].

As an example, the QP in a bitstream may be equal to 29 for a first block in a slice. Assuming that the QP is predicted from the previous QP, and the first two deltaQP values are −1 and 2, the corresponding two QP values would become 28 and 30 in state-of-the art video coding. For the first embodiment, if the resolution parameter is signaled as proposed, the resolution is halved and the first two QP values become 27 and 31.

The resolution parameter can be provided, i.e., signaled, in a Sequence Parameter Set (SPS), to be retained for a whole coded video sequence, in a Picture Parameter Set (PPS), to be retained for a whole picture, in a slice header, to be retained for a whole slice, or on block level.

A common resolution parameter can be used for all color components. Alternatively, separate resolution parameters may be used for each color component (e.g., three resolution parameters for YCbCr), or separate resolution parameters for luma and chroma (e.g., two resolution parameters for YCbCr, one resolution parameter for Y, and one resolution parameter for both Cb and Cr).

Figure 5:
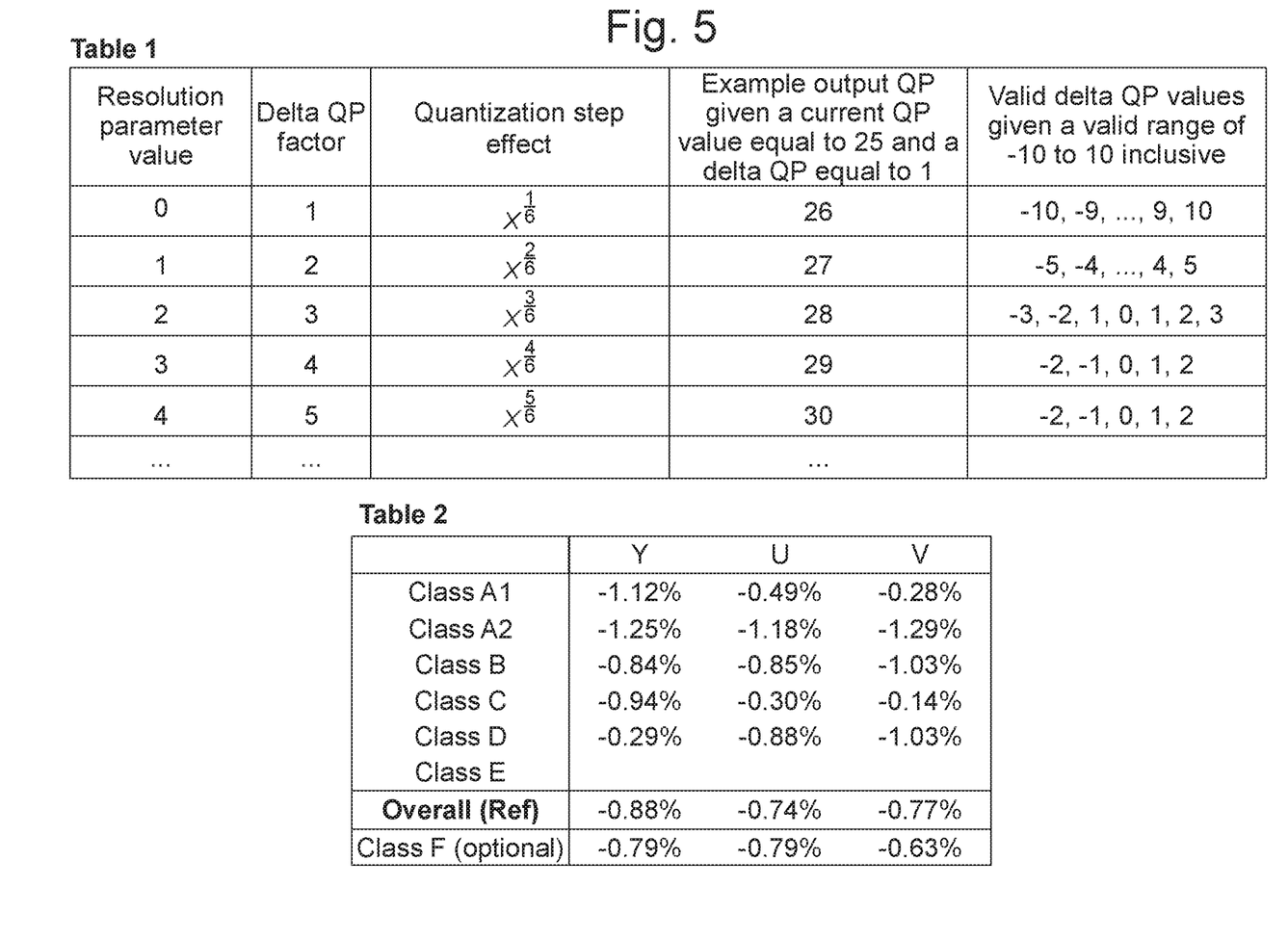
FIG. 5 shows tables elucidating embodiments of the invention.

The resolution parameter may be signaled as an integer value n, where a value of 0 means using the default resolution, a value of 1 means using half resolution as described above, a value of 2 means using one third resolution, and so forth, as is exemplified in the Table 1 shown in FIG. 5.

A decoder may parse a decoded deltaQP value from the bitstream, multiply the decoded deltaQP value by a value derived from the resolution parameter value, and use the obtained value as the deltaQP value thereafter.

More specifically, a decoder may implement decoding a block B of video samples, in accordance with the first embodiment of the invention, as follows:

1. A Delta Quantization Parameter Resolution Parameter (DQPRP) value is decoded from the bitstream 2. A Predicted Quantization Parameter (PQP) value is derived for a block B having non-zero residual coefficients 3. A Decoded Block Delta Quantization Parameter (DDQP) value for block B is decoded from the bitstream 4. A Scaled Block Delta Quantization Parameter (SDQP) value for block B is derived from the DDQP value and the DQPRP value, such that the derived SDQP value is different from the DDQP value.

5. A block Quantization Parameter (QP) value is derived for block B from the SDQP value and the PQP value.

6. At least one non-zero coefficient of block B is decoded from the bitstream

7. Values of a residual block for block B are derived by first scaling the at least one non-zero coefficient using said QP value and thereafter applying an inverse transform 8. Values of a prediction block for block B are derived by spatial of temporal prediction 9. Decoded sample values for block B are derived by adding the values of said residual block and the values of said predication block.

The DQPRP value may be decoded as an integer denoting the value delta_qp_factor−1, where delta_qp_factor is used for deriving the SDQP value. A decoded value of 0 means that delta_qp_factor is equal to 1, a decoded value 1 means that delta_qp_factor is equal to 2, etc, i.e., delta_qp_factor=DQPRP+1.

The SDQP value may subsequently be derived by multiplying the delta_qp_factor value and the DDQP value. In order to arrive at an SDQP value which is different from the DDQP value, delta_qp_factor is not equal to one, and DQPRP is accordingly larger than zero.

The QP value may be derived by adding the SDQP value and the PQP value.

The scaling of the at least one non-zero coefficient may be done by computing:

$$coeff*scaling\_factor*levelScale[QP \bmod n]<<(QP/n),$$

where coeff is the at least one non-zero coefficient, scaling_factor is a scaling factor that depends on the size of the inverse transform, levelScale is an array with n entries, and QP is the block quantization value derived in step 5 above. "<<" is the left-shift bit-operator. Preferably, n is equal to 6, as is the case in HEVC.

Preferably, a valid range of QP values is defined, either by disallowing deltaQP values that would result in an output QP value that is outside the valid range, or by using wrap-around, which is well-known from, e.g., HEVC.

It is also preferred that the deltaQP is limited by defining a valid range of deltaQP*deltaQPfactor, where deltaQPfactor is the value obtained from Table 1, which also lists valid deltaQP values given an example for a valid range of deltaQP*deltaQPfactor between −10 and 10, inclusive.

On the encoder side, the deltaQP to be coded (iDQp_to_be_coded) is typically derived as iDQp, which is equal to the actual QP minus the predicted QP, divided by the resolution before coding as:

iDQp_to_be_coded=iDQp/VAR_BASED_DELTA_QP_RES

For instance, if the resolution is 1/3, VAR_BASED_DELTA_QP_RES is equal to 3, and if iDQp is equal to 3, the deltaQP to be coded is equal to 1.

On the decoder side, deltaQP is decoded (iDQp_decoded) and then multiplied by the resolution before it is used in the decoding process:

iDQp=VAR_BASED_DELTA_QP_RES*iDQp_decoded

Then, iDQp is added to the predicted QP to derive the block QP. For example, if decoded deltaQP is equal to 1 and the resolution is 1/3, i.e., VAR_BASED_DELTA_QP_RES is equal to 3, then 3·1=3 will be added to the predicted QP.

One approach to use deltaQP with reduced resolution is to first apply a prediction of the QP and then encode the difference between the desired QP and the predicted QP. To make sure that the predicted QP is aligned with the resolution of the deltaQP, one can round the predicted QP such that it only can take values equal to a sum of the slice QP and a scaled deltaQP. For example, if the predicted QP is 39, the deltaQP resolution is 1/3, and the slice QP is 37, the predicted QP is rounded to 40. The pseudo-code below describes the rounding:

```
Int deltaQP = getSlice( )->getSliceQp( ) - (Int)QP;
if(deltaQP > 0)
{
    // quantize QP to be multiple of
    // VAR_BASED_DELTA_QP_RES from slice QP
    deltaQP = VAR_BASED_DELTA_QP_RES*((deltaQP +
    VAR_BASED_DELTA_QP_RES/2)/VAR_BASED_DELTA_QP_RES);
}
else
{
    if(deltaQP < 0)
    {
        // quantize QP to be multiple of
        // VAR_BASED_DELTA_QP_RES from slice QP
        deltaQP = VAR_BASED_DELTA_QP_RES*((deltaQP -
        VAR_BASED_DELTA_QP_RES/2)/
        VAR_BASED_DELTA_QP_RES);
    }
}
QP = (Char)(getSlice( )->getSliceQp( ) - deltaQP);
```

In case the predicted QP is rounded to a QP which is larger than the maximum QP (which is 51 in HEVC), the predicted QP is adjusted to become the next-lower QP that is aligned with the deltaQP resolution. For example, if the maximum allowed QP is 51, the rounded QP is 52, the slice QP is 37, the deltaQP resolution is 1/3, the predicted QP becomes 49. This is illustrated by the following pseudo-code:

```
if(QP > MAX_QP)
{
    int sliceQP = getSlice( )->getSliceQp( );
    QP = sliceQP + VAR_BASED_DELTA_QP_RES*
    ((MAX_QP-sliceQP)/VAR_BASED_DELTA_QP_RES);
}
```

Aligning the QP with the deltaQP resolution enables storing the deltaQP values at reduced resolution instead of full resolution internally in the codec. This may reduce the bit depth of stored QPs and thereby save storage space. In this case, the prediction of QP can be performed on deltaQPs with reduced resolution instead of deltaQPs at full resolution. This approach also avoids the need to align the predicted QP with the resolution of deltaQP, since prediction is performed in reduced resolution. Whenever a QP is needed for quantization or dequantization, the slice QP is added to the reduced resolution deltaQP multiplied with a resolution scaling factor to produce the full resolution. For example, if the slice QP is 37, the reduced deltaQP is 1, and the reduced resolution is 1/3, the QP can be derived as 37+1·3=40.

In Table 2 of FIG. 5, an example of BD-rate performance comparing traditional deltaQP-signaling and reduced-resolution deltaQP-signaling for random access configuration, in accordance with embodiments of the invention, is exemplified.

On 4K-sequences (class A1 and A2), the reduced-resolution deltaQP-signaling results in a more than 1% lower bitrate at the same quality, as compared to JEM v6.0.

In Table 2, comparison is made to JEM v6.0, modified to use an adaptive QP algorithm which uses lower QP values for blocks having lower sample variance and higher QP values for blocks with higher sample variance. The sample variance is the variance of the luma samples in a block. A modified deltaQP coding method was added, in which decoded deltaQP values are multiplied by a factor before it is added to the current QP. This means that the deltaQP granularity is coarser than in JEM v6.0.

Table 2 further shows that the modified deltaQP coding, in accordance with embodiments of the invention, provides a bitrate saving of 0.88% on average over JEM v6.0, which is a substantial saving.

Embodiment 2

For the second embodiment, the resolution of the quantization parameter QP, as well as the resolution of deltaQP, is controlled, rather than only the resolution of deltaQP. Given that the resolution parameter indicates a doubling in quantization effect, a mapping from resolution QP value (resQP) to original QP value (QP) is done by calculating QP=2·resQP. This means that a signaled QP of, e.g., 10 is converted to 20 before it is used in the dequantization process.

For the second embodiment, the QP prediction process may be performed in the alternate resolution domain (which normally is the reduced resolution domain), such that both signaling of QP and deltaQP values, as well as the QP prediction process, is performed in the alternate resolution domain. Inverse quantization is done using QP values that are converted from the alternate resolution domain.

Alternatively, the QP prediction process may be modified to output values that fit the resolution of the QP. This may mean that the QP prediction process is modified so that the QP prediction QPp is set such that [(QPp−sliceQP) mod resolution] is equal to 0, where sliceQP is the value of the slice QP. Alternatively, QPp is set such that (QPp mod resolution) is equal to 0.

Rounding using the modulo operation may be used as a last step of the process that computes predicted QP values. If the output from the modulo operation using an input QP prediction value is not equal to zero, an output QP prediction value QPo is computed and output from the process. QPo is computed such that the difference abs(QPp−QPo) is minimized, where the modulo operation on QPo is equal to zero. If there are two QPo values with the same distance to QPp, either the larger or the smaller of the two QPo is used. Optionally, there may be a rule to always use the larger, or to always use the smaller, of the two values.

In HEVC, the slice QP is the value of the QP to use for the first block. It can be seen as the QP predictor for the first block of the slice. It should be noted that codecs other than HEVC may not use slices and accordingly do not have a slice QP. It should further be noted that the slice QP described herein is essentially a picture QP in scenarios where a picture is encoded using a single slice.

Embodiment 3

In the third embodiment, the number of QP step increments to double the quantization effect is signaled in the bitstream. The property to have a certain number of QP steps to double the quantization effect is important in order to reduce the QI table size, since it allows reusing table entries for multiple QP values. For HEVC, the number of steps required to double the quantization effect is six, i.e., a default denominator of six (6) is used. A coarser granularity can be achieved by specifying the denominator in the quantization step effect fractional and signaling the specified denominator.

Table 3 of FIG. 5 shows a number of examples. The first row is identical to what is being used for HEVC. The other rows show quantization settings that have coarser granularity. In Table 3, the first column shows the code word and the denominator value. Usually, lower-value code words are signaled with fewer bits, so the parameters which are closest to the HEVC design (which is using a denominator value equal to 6) should be represented by lower code word values and accordingly fewer bits. For a certain denominator value d, the quantizer step-size for a QP value q becomes $\Delta Q[q \bmod d] \cdot 2^{q \; div \; d}$, where possible $\Delta Q$ alternatives are shown in the third column. The fourth column shows integer arrays QI for each denominator, given that a scaling of 64 is used, as in HEVC. It will be appreciated that other scaling values are possible. In order to keep the quantization effect range similar, column five specifies possible QP ranges, all starting from 0, and the sixth column shows the quantization effect calculated from $\Delta Q$.

As can be seen in Table 3, several QI elements are identical. Accordingly, it may suffice to store the QI arrays for d equal to 6 and 5 (the first two rows in Table 3) at the encoder and at the decoder, and to derive the values for the other alternatives from the array where d equals 6. This means that, in addition to the six values that are stored for HEVC, only five more values need to be stored at the encoder and at the decoder.

Many alternative embodiments of the proposed solution may be envisaged. For instance, the $\Delta Q$ elements may be scaled such that they all have an identical minimum quantization effect as calculated from $\Delta Q$, as is exemplified in Table 4 of FIG. 5. The scaling factor s shown in column 2 of Table 4 is multiplied with the $\Delta Q$ array in column 3.

Although the third embodiment has been described with a focus on using a coarser granularity than what is currently used, it is also possible to use the techniques described in relation to the third embodiment to enable signaling of finer granularities, e.g., to signal quantization step effects of $X^{1/n}$, where n is larger than 6.

Embodiment 4

For increased flexibility, one can use a design where both the nominator and the denominator, as is described in relation to the third embodiment, are signaled. This enables quantization effects of the type $X^{m/n}$, where m is the nominator and n is the denominator, and accordingly additional quantization step effects such as $X^{2/3}$, $X^{4/3}$, $X^{2/5}$, $X^{3/5}$, and $X^{4/5}$. To avoid signaling duplicate values, a code word may be assigned to each unique combination of nominator and denominator.

As an alternative, the number of QP steps which are required to quadruple the quantization effect may be signaled. Note that even numbers may be equivalently expressed in terms of the number of steps to double the quantization effect, but odd numbers cannot be expressed in this way. Using the known solutions, QI tables for odd numbers and corresponding shifts can be designed such that the quantizer step size for a QP value is $\Delta Q[QP \bmod n] \cdot 4^{QP \; div \; n}$, where n is the number of steps required to quadruple the quantization effect, e.g., 3, 5, 7, and 9. Even numbers can be represented as ΔQ[QP mod n]·$2^{QP\ div\ n}$. It would also be possible to design the quantizer to triple the quantization effect, etc. In general, embodiments of the invention may utilize QI tables in which the quantizer step size for a QP value is ΔQ [QP mod n]·$X^{QP\ div\ n}$, and X may be set to one of 2, 3, 4, 5 etc.

Embodiment 5

For the fifth embodiment, the resolution of deltaQP is coarser for smaller block sizes than for large block sizes.

For instance, block sizes larger than a threshold size of N×N may have one QP resolution, and block sizes equal to or smaller than N×N may use another QP resolution. As an example, block sizes equal to 16×16 or smaller may have a resolution of deltaQP in steps of 2, while block sizes above 16×16 may have step sizes of 1.

For a mix of square and rectangular blocks, the resolution of deltaQP can depend on the minimum of the width and the height of the block. Blocks with the minimum of width and height which is equal to or smaller than N may have one QP resolution, and blocks with the minimum of width and height larger than N may use another QP resolution. As an example, blocks with the minimum of width and height equal to or smaller than 16 may change deltaQP in steps of 2, and other blocks can change deltaQP in steps of 1.

Another alternative for the case of a mix of rectangular and square blocks is to use a resolution which is dependent on the area of the block. For example, blocks with an area which is equal to or smaller than 256 can change deltaQP in steps of 2, and blocks with area larger than 256 may change deltaQP in steps of 1.

One or several size parameters which control the resolution of deltaQP can be provided in SPSs, to be retained for a whole sequence, in PPSs, to be retained for a whole picture, in a slice header, to be retained for a whole slice, or on block level.

Embodiment 6

For the sixth embodiment, the resolution of deltaQP is coarser for higher QP values than for lower QP values. If a particular QP parameter value is equal to, or larger than, N, one QP resolution may be used, while for QP parameter values smaller than N another QP resolution may be used. The particular QP parameter value can be the QP signaled in the PPS, the QP for the picture, the QP for the slice (signaled in the slice header), or the predicted QP.

As an example, if the value of the slice QP or predicted QP is equal to, or above, 37, the resolution of deltaQP is changed in steps of 2, while for QPs below 37 the resolution of deltaQP is changed in steps of 1.

Embodiment 7

For the seventh embodiment, the resolution of the QP depends on the layer to which the picture belongs. The layer identifier, layer id or layer_id, signaled for a picture is used to determine the QP resolution. The layer can be a temporal, spatial, multi-view, or any other layer, in a multi-layer bitstream. For instance, the resolution of QP for each layer may, e.g., be signaled in a parameter set. Thereby, the QP resolution can be determined based on the layer id.

As an example, pictures encoded in a hierarchical B GOP structure may use coarser deltaQP values for pictures of the highest temporal layer.

Embodiment 8

In the eighth embodiment, the resolution of QP depends on the slice type. Example slice types include types I, B, and P. In codecs which do not support slices, the QP resolution may depend on the picture type. For example, I-slices or pictures may have finer resolution than P- or B-slices or pictures. Optionally, the resolution may be signaled for each slice or picture type.

Figure 2:
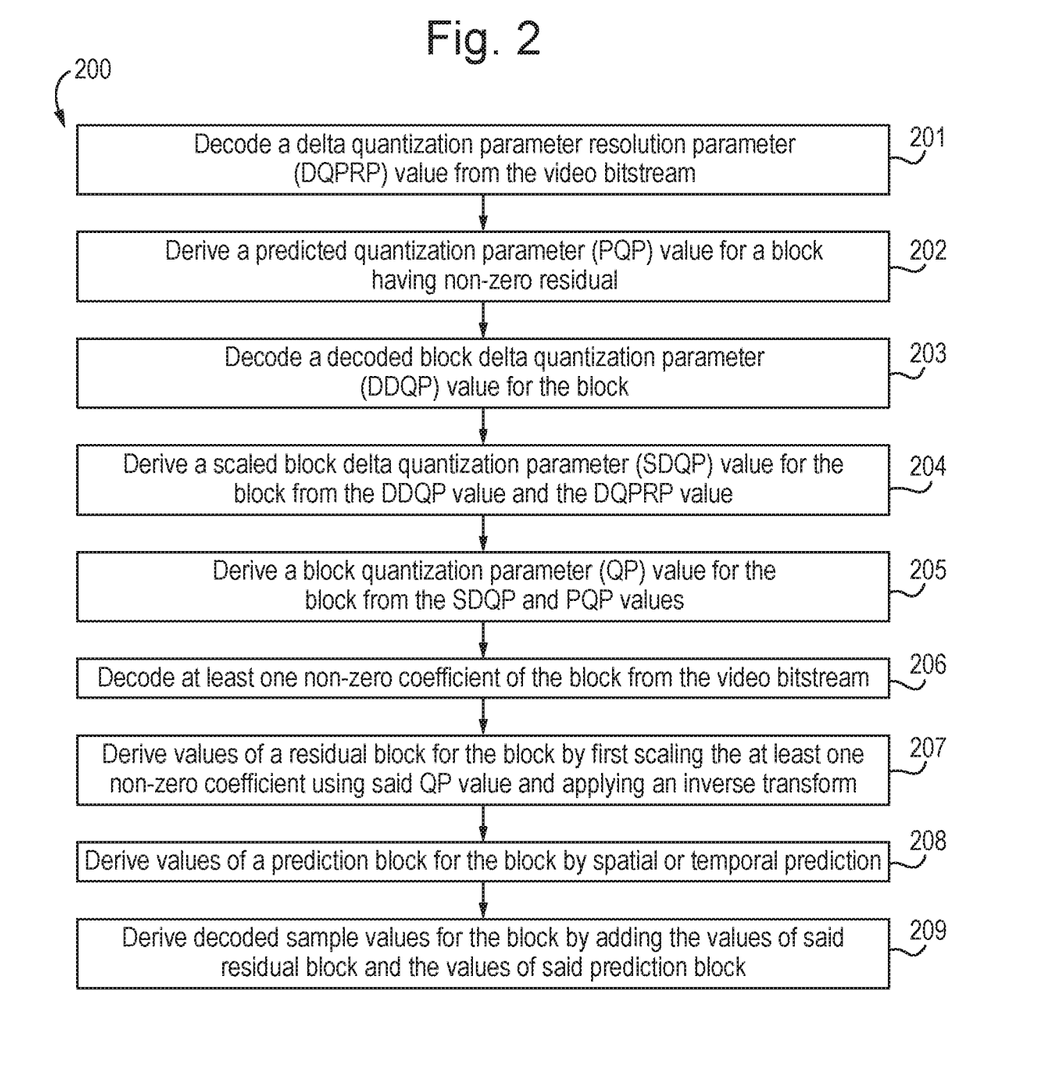
FIG. 2 shows the method of decoding a block of video samples having non-zero coefficients from a video bitstream, in accordance with embodiments of the invention.

In the following, embodiments of the method 200 of decoding a block of video samples from a video bitstream are described with reference to FIG. 2.

Method 200 comprises decoding 201 a DQPRP value from the video bitstream, deriving 202 a PQP value for a block having a non-zero residual, decoding 203 a DDQP value for the block, deriving 204 a SDQP value for the block from the DDQP value and the DQPRP value, deriving 205 a block QP value for the block from the SDQP value and the PQP value, decoding 206 at least one non-zero coefficient of the block from the video bitstream, deriving 207 values of a residual block for the block by first scaling the at least one non-zero coefficient using said QP value and thereafter applying an inverse transform, deriving 208 values of a prediction block for the block by spatial or temporal prediction, and deriving 209 decoded sample values for the block by adding the values of said residual block and the values of said prediction block.

Optionally, the deriving 204 a SDQP value for the block may comprise deriving the SDQP value as SDQP=DDQP*(DQPRP+1).

Optionally, the scaling the at least one of the non-zero coefficients, coeff, using said QP value comprises computing:

$$\text{coeff}*\text{scaling\_factor}*\text{levelScale}[\text{QP mod } n]<<(\text{QP}/n),$$

where scaling_factor is a scaling factor that depends on a size of the inverse transform, levelScale is an array with n entries, and QP is the derived block QP value.

Method 200 may further comprise rounding the derived PQP value such that it only can take values that the deltaQP with reduced resolution can have.

Optionally, the DQPRP value may depend on a size of the block, such that a resolution represented by the DQPRP value is coarser for smaller blocks than for larger blocks.

Optionally, the DQPRP value may depend on any one of: a QP value signaled in a PPS, a QP value associated with a picture comprising the block, a QP value associated with a slice comprising the block, and the PQP.

Optionally, the DQPRP value may depend on a layer identifier of a layer comprising the block.

Optionally, the DQPRP value may depend on a type of a slice comprising the block.

Figure 3:
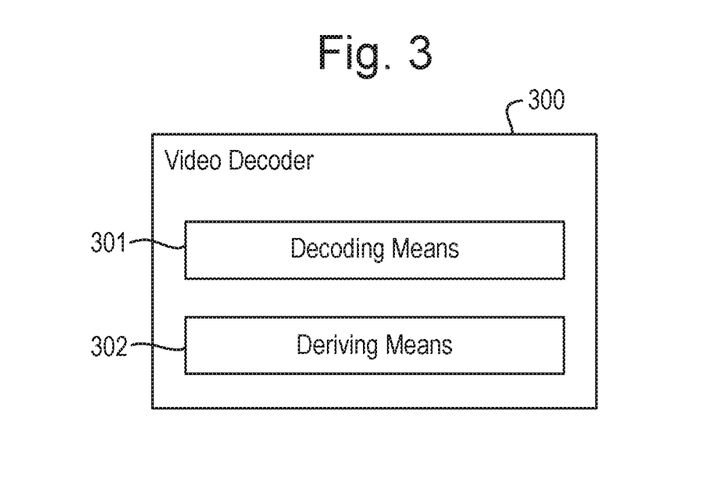
FIG. 3 shows a video decoder for decoding a block of video samples having non-zero coefficients from a video bitstream, in accordance with embodiments of the invention.

FIG. 3 shows a video decoder 300 for decoding a block of video samples having non-zero coefficients from a video bitstream, in accordance with embodiments of the invention. The video decoder 300 comprises decoding means 301 and deriving means 302. The decoding means 301 is configured to decode a DQPRP value from the video bitstream, to decode a DDQP value for the block, and to decode at least one non-zero coefficient of the block from the video bitstream. The deriving means 302 is configured to derive a PQP value for a block having a non-zero residual, to derive a SDQP value for the block from the DDQP value and the DQPRP value, to derive a block QP value for the block from the SDQP value and the PQP value, to derive values of a residual block for the block by first scaling the at least one non-zero coefficient using said QP value and thereafter applying an inverse transform, to derive values of a prediction block for the block by spatial or temporal prediction, and to derive decoded sample values for the block by adding the values of said residual block and the values of said prediction block. It will be appreciated that the decoding means 301 and the deriving means 302 may be configured to perform alternative or additional functionality as described herein.

The video decoder 300 may be implemented in hardware, software, or a combination of hardware and software. The video decoder 300 may, e.g., be comprised in a user equipment, such as a mobile telephone, a tablet, a desktop computer, a netbook, a multimedia player, a set-top box, or a computer.

Figure 4:
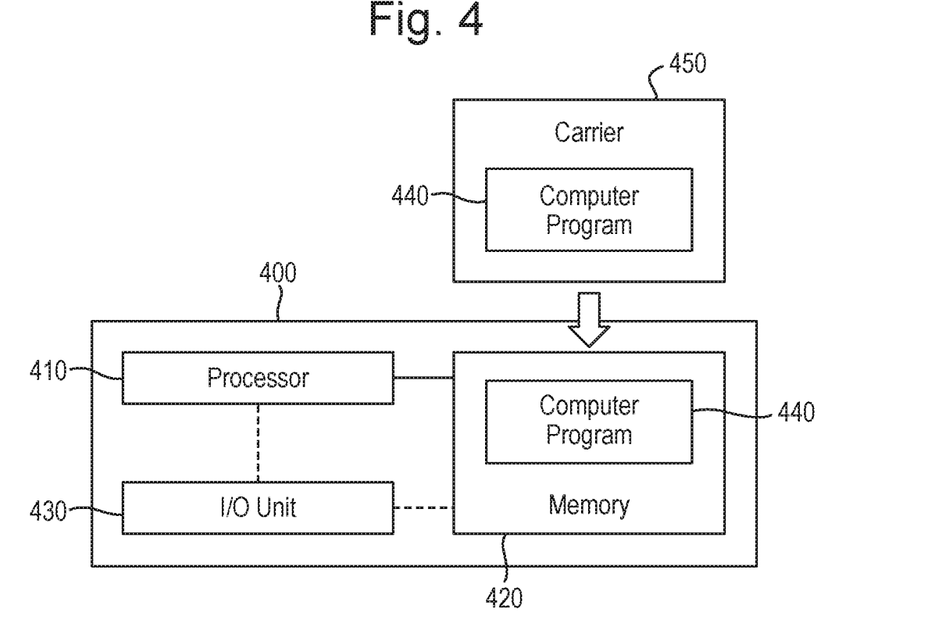
FIG. 4 illustrates a data processing system used to implement the methods described herein according to the embodiments of the present invention.

An alternative embodiment 400 of the video decoder is shown in FIG. 4. The video decoder 400 comprises processing means 410, such as a processor, processor circuitry, or the like, and a memory 410 comprising instructions 440, i.e., a computer program, which, when executed by the processing means 420, cause the video decoder 400 to decode a DQPRP value from the video bitstream, derive a PQP value for a block having a non-zero residual, decode a DDQP value for the block, derive a SDQP value for the block from the DDQP value and the DQPRP value, derive a block QP value for the block from the SDQP value and the PQP value, decode at least one non-zero coefficient of the block from the video bitstream, derive values of a residual block for the block by first scaling the at least one non-zero coefficient using said QP value and thereafter applying an inverse transform, derive values of a prediction block for the block by spatial or temporal prediction, and derive decoded sample values for the block by adding the values of said residual block and the values of said prediction block. The instructions 440 may further cause the video decoder 400 to perform alternative or additional operations as described herein. The video decoder may optionally comprise an I/O unit 430 to enable input and/or output of relevant data, such as reconstructed or decoded pictures of a video sequence. The video decoder 400 may be part of a data processing system. The computer program 440 may be loaded into the memory 420 for execution by the processing means 410. The video decoder 400 may, e.g., be comprised in a user equipment, such as a mobile telephone, a tablet, a desktop computer, a netbook, a multimedia player, a set-top box, or a computer.

The term 'processor' should be interpreted in a general sense as any circuitry, system, or device, capable of executing program code or computer program instructions to perform a particular processing, determining, or computing task.

The person skilled in the art realizes that the invention by no means is limited to the embodiments described above. On the contrary, many modifications and variations are possible within the scope of the appended claims.

The invention claimed is:

1. A method of decoding a block of video samples having non-zero coefficients from a video bitstream, the method being performed by a video decoder and comprising:
    decoding a Delta Quantization Parameter Resolution Parameter, DQPRP, value from the video bitstream;
    deriving a Predicted Quantization Parameter, PQP, value for a block having a non-zero residual;
    decoding a Decoded Block Delta Quantization Parameter, DDQP, value for the block;
    deriving a Scaled Block Delta Quantization Parameter, SDQP, value for the block from the DDQP value and the DQPRP value;
    deriving a block Quantization Parameter, QP, value for the block from the SDQP value and the PQP value;
    decoding at least one non-zero coefficient of the block from the video bitstream;
    deriving values of a residual block for the block by first scaling the at least one non-zero coefficient using the QP value and thereafter applying an inverse transform;
    deriving values of a prediction block for the block by spatial or temporal prediction; and
    deriving decoded sample values for the block by adding the values of the residual block and the values of the prediction block.

2. The method according to claim 1, wherein the deriving a SDQP value for the block comprises deriving the SDQP value as SDQP=DDQP*(DQPRP+1).

3. The method according to claim 1, wherein the scaling the at least one of the non-zero coefficients, coeff, using the QP value comprises computing:

$$\text{coeff*scaling\_factor*levelScale}[QP \bmod n] << (QP/n),$$

where scaling_factor is a scaling factor that depends on a size of the inverse transform, levelScale is an array with n entries, and QP is the derived block QP value.

4. The method according to claim 1, further comprising rounding the derived PQP value such that it only can take values that the deltaQP with reduced resolution can have.

5. The method according to claim 1, wherein the DQPRP value depends on a size of the block, such that a resolution represented by the DQPRP value is coarser for smaller blocks than for larger blocks.

6. The method according to claim 1, wherein the DQPRP value depends on any one of: a QP value signaled in a Picture Parameter Set (PPS), a QP value associated with a picture comprising the block, a QP value associated with a slice comprising the block, and the PQP.

7. The method according to claim 1, wherein the DQPRP value depends on a layer identifier of a layer comprising the block.

8. The method according to claim 1, wherein the DQPRP value depends on a type of a slice comprising the block.

9. A video decoder for decoding a block of video samples having non-zero coefficients from a video bitstream, the video decoder comprising a processor and a memory comprising instructions which, when executed by the processor, cause the video decoder to:
    decode a Delta Quantization Parameter Resolution Parameter, DQPRP, value from the video bitstream;
    derive a Predicted Quantization Parameter, PQP, value for a block having a non-zero residual;
    decode a Decoded Block Delta Quantization Parameter, DDQP, value for the block;
    derive a Scaled Block Delta Quantization Parameter, SDQP, value for the block from the DDQP value and the DQPRP value;
    derive a block Quantization Parameter, QP, value for the block from the SDQP value and the PQP value;
    decode at least one non-zero coefficient of the block from the video bitstream;
    derive values of a residual block for the block by first scaling the at least one non-zero coefficient using the QP value and thereafter applying an inverse transform;
    derive values of a prediction block for the block by spatial or temporal prediction; and
    derive decoded sample values for the block by adding the values of the residual block and the values of the prediction block.

10. The video decoder according to claim 9, wherein the instructions cause the video decoder to derive a SDQP value for the block by deriving the SDQP value as SDQP=DDQP*(DQPRP+1).

11. The video decoder according to claim 9, wherein the instructions cause the video decoder to scale the at least one of the non-zero coefficients, coeff, using the QP value by computing:

$$coeff*scaling\_factor*levelScale[QP \bmod n]<<(QP/n),$$

where scaling_factor is a scaling factor that depends on a size of the inverse transform, levelScale is an array with n entries, and QP is the derived block QP value.

12. The video decoder according to claim 9, wherein the instructions further cause the video decoder to round the derived PQP value such that it only can take values that the deltaQP with reduced resolution can have.

13. The video decoder according to claim 9, wherein the DQPRP value depends on a size of the block, such that a resolution represented by the DQPRP value is coarser for smaller blocks than for larger blocks.

14. The video decoder according to claim 9, wherein the DQPRP value depends on any one of: a QP value signaled in a Picture Parameter Set (PPS), a QP value associated with a picture comprising the block, a QP value associated with a slice comprising the block, and the PQP.

15. The video decoder according to claim 9, wherein the DQPRP value depends on a layer identifier of a layer comprising the block.

16. The video decoder according to claim 9, wherein the DQPRP value depends on a type of a slice comprising the block.

17. A non-transitory computer readable storage medium storing a computer program comprising computer-executable instructions for causing a processing unit of a video decoder to perform a method of decoding a block of video samples having non-zero coefficients from a video bitstream, the method comprising:

deriving a Delta Quantization Parameter Resolution Parameter, DQPRP, value from the video bitstream;

deriving a Predicted Quantization Parameter, PQP, value for a block having a non-zero residual;

decoding a Decoded Block Delta Quantization Parameter, DDQP, value for the block;

deriving a Scaled Block Delta Quantization Parameter, SDQP, value for the block from the DDQP value and the DQPRP value;

deriving a block Quantization Parameter, QP, value for the block from the SDQP value and the PQP value;

decoding at least one non-zero coefficient of the block from the video bitstream;

deriving values of a residual block for the block by first scaling the at least one non-zero coefficient using the QP value and thereafter applying an inverse transform;

deriving values of a prediction block for the block by spatial or temporal prediction; and deriving decoded sample values for the block by adding the values of the residual block and the values of the prediction block.

18. The method according to claim 2, wherein the scaling the at least one of the non-zero coefficients, coeff, using the QP value comprises computing:

$$coeff*scaling\_factor*levelScale[QP \bmod n]<<(QP/n),$$

where scaling_factor is a scaling factor that depends on a size of the inverse transform, levelScale is an array with n entries, and QP is the derived block QP value.

19. The method according to claim 2, further comprising rounding the derived PQP value such that it only can take values that the deltaQP with reduced resolution can have.

20. The video decoder according to claim 10, wherein the instructions cause the video decoder to scale the at least one of the non-zero coefficients, coeff, using the QP value by computing:

$$coeff*scaling\_factor*levelScale[QP \bmod n]<<(QP/n),$$

where scaling_factor is a scaling factor that depends on a size of the inverse transform, levelScale is an array with n entries, and QP is the derived block QP value.

* * * * *